United States Patent [19]
Carter

[11] Patent Number: 5,666,122
[45] Date of Patent: Sep. 9, 1997

[54] METHOD FOR RAPID SIGNAL ACQUISITION IN A SATELLITE COMMUNICATIONS SYSTEM

[75] Inventor: Stephen S. Carter, San Diego, Calif.

[73] Assignee: Qualcomm Incorporated, San Diego, Calif.

[21] Appl. No.: 272,485

[22] Filed: Jul. 11, 1994

[51] Int. Cl.⁶ .............................. G01S 5/02; H04B 7/185
[52] U.S. Cl. .................................... 342/357; 455/12.1
[58] Field of Search .................................. 342/357, 356, 342/352; 455/12.1

[56] References Cited

U.S. PATENT DOCUMENTS

| 5,119,504 | 6/1992 | Durboraw, III | 342/357 |
| 5,365,450 | 11/1994 | Schuchman et al. | 342/457 |
| 5,420,593 | 5/1995 | Niles | 342/357 |

FOREIGN PATENT DOCUMENTS

| 0429769 | 6/1991 | European Pat. Off. | G01S 5/14 |
| 0429783 | 6/1991 | European Pat. Off. | G01S 5/14 |
| 0447978 | 9/1991 | European Pat. Off. | G01S 5/14 |
| 0546758 | 6/1993 | European Pat. Off. | G01S 5/14 |

*Primary Examiner*—Gregory C. Issing
*Attorney, Agent, or Firm*—Russell B. Miller; Gregory D. Ogrod

[57] ABSTRACT

The signal acquisition process of the present invention enables a radio to rapidly acquire a pilot signal from a satellite after the radio has been out of contact with the satellite for a length of time. The radio first acquires a satellite pilot signal and determines its position in relation to the earth. If the radio is now shut off or loses track of the pilot signal for some other reason, the radio keeps track of the length of time that it has been out of contact with the satellite. This length of time enables the radio to estimate the extent of possible position changes and, therefore, which satellites might be in view and their relative positions to the radio. This allows the radio to make assumptions about variables such as the Doppler shift of the signal that reduces the uncertainty inherent in the acquisition process and the size of the window that must be searched.

20 Claims, 2 Drawing Sheets

METHOD FOR RAPID SIGNAL ACQUISITION IN A SATELLITE COMMUNICATIONS SYSTEM

BACKGROUND OF THE INVENTION

1. Field of the Invention

The present invention relates to satellite communications. More particularly, the present invention relates to acquiring satellite signals.

2. Description of Related Art

When a radiotelephone is turned on in a cellular or satellite radiotelephone environment, it typically must search for and acquire the forward link signal transmitted by a base station. This forward link signal, referred to as the pilot signal in a CDMA system, is continuously transmitted by the base station. The pilot signal is used by the radiotelephone to obtain initial system synchronization and to provide robust time, frequency, and phase tracking of the signals from the base station.

In a CDMA radiotelephone system, the radiotelephone cannot transmit until the pilot signal is acquired. This signal, therefore, must be acquired rapidly after the radiotelephone is turned on since a radiotelephone user typically does not want to wait to make a telephone call after turning on the radiotelephone.

In a ground based CDMA cellular system, pilot signal acquisition typically takes only a few seconds. This is largely due to the known proximity of the cell sites to the radiotelephone and the fact that the cell is stationary. The pilot signal, therefore, has a relatively short delay to reach the radiotelephone and the Doppler shift of the frequency of the pilot signal is slight.

Acquiring a pilot signal in a satellite based communication system, however, may take significantly longer since there is a greater frequency uncertainty that must be searched. The frequency uncertainty may be due to the range of possible Doppler shift caused by the rapidly moving low earth orbit (LEO) satellites. Other sources of uncertainty, such as the larger possible round trip time delay of the signal through the satellite can magnify the acquisition problem. There is a resulting need for a method for rapidly acquiring a signal transmitted from a satellite communication system.

SUMMARY OF THE INVENTION

The process of the present invention enables a mobile radio to rapidly acquire a signal from a satellite or a number of satellites that are part of a constellation of satellites. The radio has a real-time clock and memory containing the ephemeris of each of the satellites. The process begins by the radio first determining its spatial position in relation to the earth. The time that this position was determined is also noted. Both the position and the time are stored for future use. If the radio is turned off and back on or the signal is lost for some other reason, a second time from the real-time clock is determined. The radio then searches for the signal in response to a difference between the first and the second times. Knowing the position of the user allows assumptions to be made that simplify acquisition. Knowing the time since the last position fix allows varying degrees of confidence in these assumptions. The smaller the difference, the smaller the frequency or time uncertainty window to be searched, thus reducing acquisition time.

DETAILED DESCRIPTION OF THE PREFERRED EMBODIMENT

Figure 1:
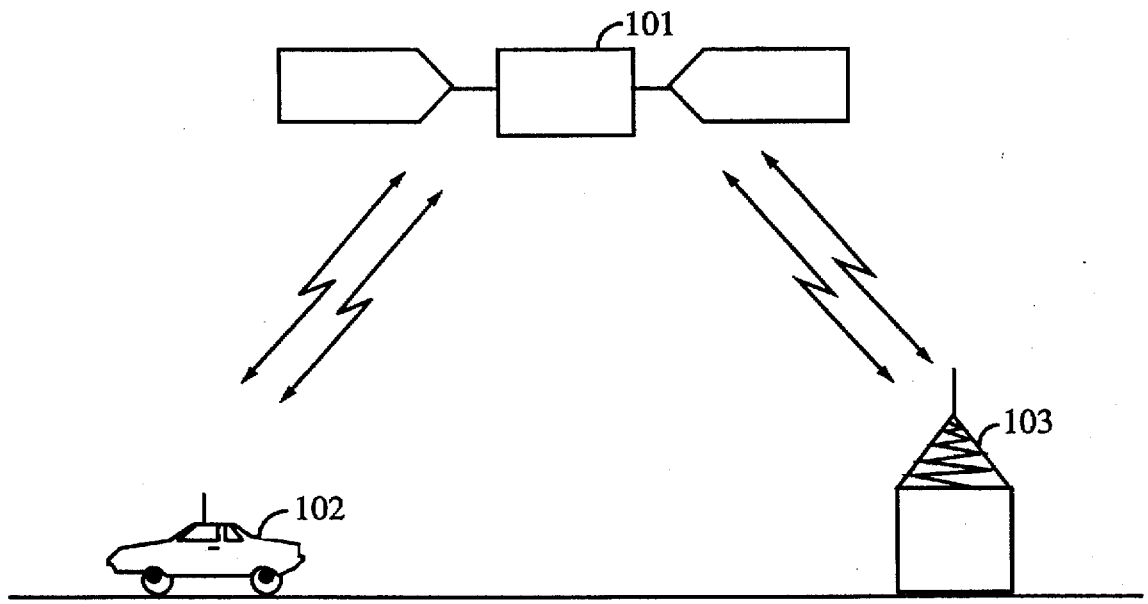
FIG. 1 shows a satellite based communication system of the present invention.

A typical satellite communication system is illustrated in FIG. 1. In the preferred embodiment, this communication system is comprised of 48 satellites (101) that act as repeaters for the signals transmitted to and from mobile radios (102) located on the earth or in an airplane at some altitude above the earth. The satellite bounces the signal back to a ground receiving station (103) connected with the public switched telephone network (PSTN). The PSTN switches the call to another cellular network or to a land-line telephone.

In the preferred embodiment, the radios are CDMA-type radiotelephones. U.S. Pat. No. 4,901,307 to Gilhousen et al. and assigned to Qualcomm Incorporated discloses the operation of such a CDMA-type radiotelephone in a terrestrial CDMA system. Alternate embodiments use time division multiple access (TDMA) or frequency division multiple access (FDMA) type radiotelephones.

The satellite communications system of the present invention operates by or through the radio first locating a pilot carrier signal transmitted by the satellites. In the preferred embodiment, this pilot signal is an unmodulated PN sequence. However, alternate embodiments have a pilot signal comprised of a preamble sequence, a preamble sequence mixed with data, a sufficiently strong information-bearing signal, or other signal types.

In the preferred embodiment, the pilot signal is transmitted by each satellite using a known frequency and pseudo noise (PN) code, possibly with different spread spectrum code generators or phase offsets, thus allowing the radio to distinguish the different satellites. Since the satellites use a known PN code and code phase, the radiotelephone's internal real-time clock synchronizes to the system timing by a search through all code generators and phases. The strongest signal found by the radio corresponds to the best satellite signal.

The satellite's rapid movement across the sky causes the frequency of the pilot signals from the various satellites to be changed due to Doppler shift. If the radio searches the frequency spectrum at the pilot signal's transmitted frequency, the signal will only be found if the satellite is directly overhead. This is also true of the PN code phase. The radio, therefore, must search a time uncertainty for the PN code phase and the frequency uncertainty to acquire the satellite. The process of the present invention reduces this uncertainty by using knowledge of satellite and radio position.

Figure 2:
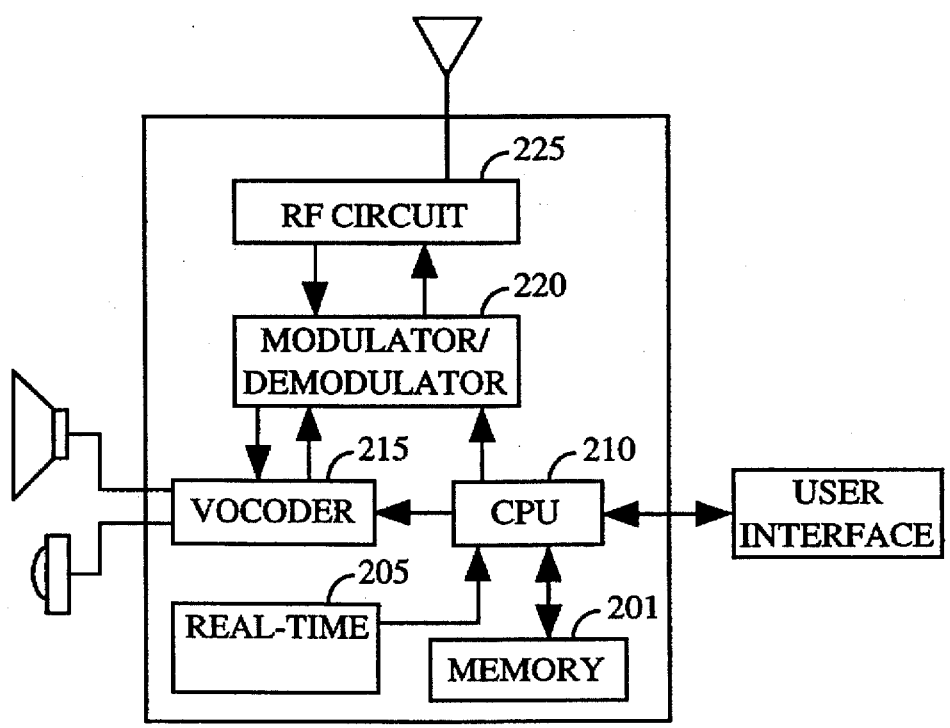
FIG. 2 shows a block diagram of a typical radio of the present invention.

A typical radio (200) of the present invention is illustrated in FIG. 2. The radio (200) is comprised of memory (201) that stores the ephemeris of each satellite. In the preferred embodiment, this memory (201) is nonvolatile random access memory (RAM). This allows the radio (200) to update it's ephemeris data when a satellite is out of service or changes orbit. Alternate embodiments use programmable read only memory in which each satellite's ephemeris is permanently stored. Still another alternate embodiment uses battery backed-up RAM.

The radio (200) also consists of a real-time clock (205) that is discussed later, a processor (210) to control the radio, a vocoder (215) to encode and decode the user's voice, a modulation/demodulation circuit (220), and the radio frequency electronics (225) that convert the modulated signals to higher frequencies for transmission and received signals to lower frequencies.

Figure 4:
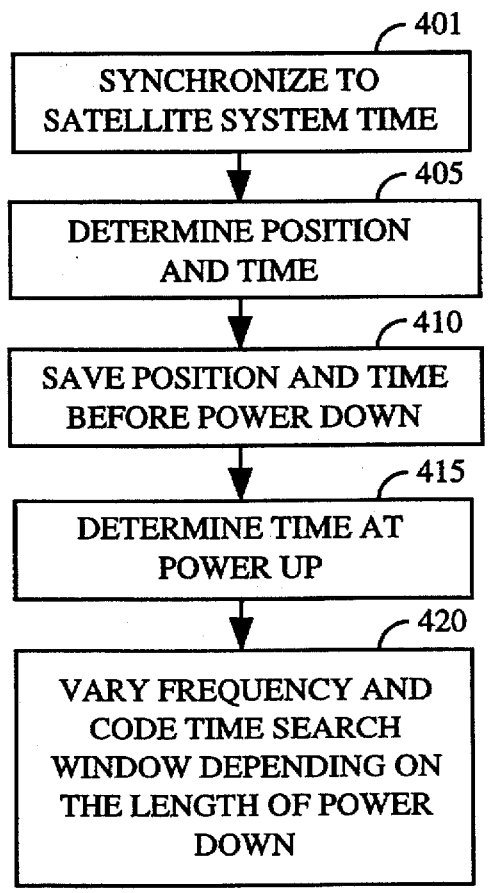
FIG. 4 shows a flowchart of the process of the present invention.

The process of the present invention, illustrated in FIG. 4, begins with the radio synchronizing its internal real-time clock to the satellite system time (401), kept by the satellites' or ground stations' internal clocks. In the preferred embodiment, the satellites simply reflect the clock signals from the ground station. Alternate embodiments use a clock in each satellite that is synchronized to the other clocks in the satellite system. Since the radio now knows the time and the ephemeris of each satellite, it knows the location of the satellites in relation to Earth.

The radio, however, has to determine its position in relation to Earth in order to know its position in relation to the satellites. The radiotelephone's position is determined (405) by triangulation with different satellites or a single satellite in different positions over time. Since the radio knows the satellites' positions, it measures the time required for a signal to reach and return from each satellite to determine its position in relation to Earth. In an alternate embodiment, it is possible to use an alternate positioning system such as the global positioning system (GPS) or a user entered position.

The radio's spatial position is stored in memory. If the radio is turned off, the time at turn-off is stored with the present spatial position (410). After the radio is turned back on, this turn-on time is determined from the a real-time clock (415). The difference between the time stored at power-down and the time at power-up allows an estimate of how far the user may have moved from the previous known position.

When the estimate of the radiotelephone's possible new position is combined with known satellite positions, a list of possible and likely satellites in view can be determined along with the possible and likely relative position of each. The radio then determines the Doppler shift and PN sequence that will be experienced from a signal being transmitted through each satellite. The Doppler shift gives the new frequency to find and the length of time the radio was off determines the width of the search window (420) about this frequency.

If the radio was only turned off a short time, it could not have traveled very far. In this case, the search window is going to be relatively small. In the preferred embodiment, the search window starts at 5 kHz for times on the order of an hour. If the radio has been off for so long time, such as greater than 24 hours, there is still a good chance that the radio did not move from its previous power on location. The user may have just turned the radio off and left it sitting. The search window, in this case, is again relatively small. In the preferred embodiment, this window is 5 kHz.

As the time that the radio is off increases, the search window increases. This is true up to the preferred embodiment's 24 hour point as discussed above. In the preferred embodiment, the search window increases by 5 kHz for every hour that the radio was turned off.

If the process of the present invention does not find the frequency of the satellite's pilot signal within the initial search window, the window is widened and the search done again. In the preferred embodiment, the window is widened 10 kHz. This widening and searching is repeated until the frequency of the signal is found or a decision is made that the user position is in error or something else is wrong with the ability to acquire the signal.

Figure 3:
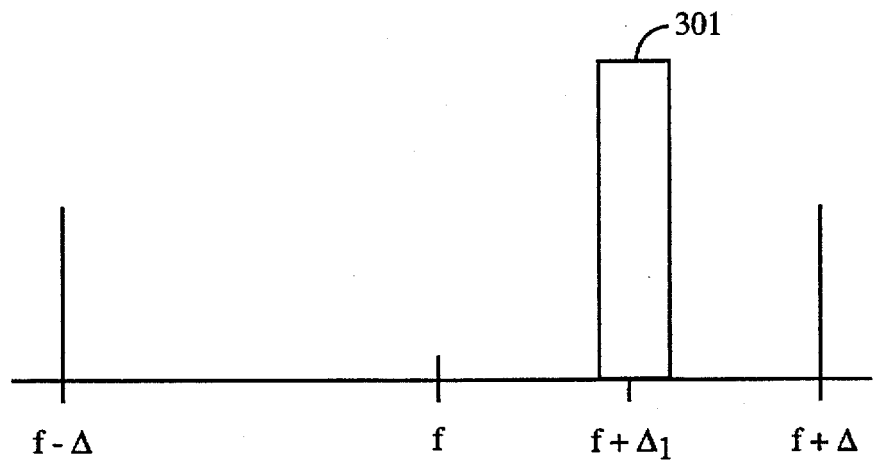
FIG. 3 shows the frequency band being searched by the process of the present invention.

An example of a search of the frequency spectrum is illustrated in FIG. 3, showing the frequency of the pilot signal as f. The expected Doppler shift is denoted as $\Delta$. The frequency band to the right of f is f+$\Delta$ while the frequency band to the left of f is f−$\Delta$. The −$\Delta$ side of the spectrum is due to the satellite moving away from the radio while the +$\Delta$ side is due to the satellite moving towards the radio.

If the radio has determined that the pilot frequency will be shifted by +$\Delta_1$ due to the satellite's relative position, a window (301) around +$\Delta_1$ is searched to find the pilot signal frequency. This window increases as the time that the radio is turned off increases. This is due to the increasing inaccuracy of the frequency determination the longer the radio is turned off. Therefore, if the radio has been turned off only a few minutes, the window to be searched will only be 5 kHz wide in the preferred embodiment. If the radio is off for a couple of hours, the width of this window increases. Alternate embodiments search different size frequency windows.

The process of the present invention also reduces uncertainties produced by mechanisms other than Doppler shift of the received signal. In alternate embodiments, different satellites use different frequencies, PN codes, and/or other differentiating characteristics. The radio's knowledge of the location of the satellites relative to the radio enables it to determine which frequencies and PN codes are available and should be searched to acquire the signal.

The signal acquisition process of the present invention also enables a radio to search a PN code phase that has been affected by a Doppler shift. In the same manner as the above described preferred embodiment, the process searches a window in the PN code phase, by estimating the Doppler affects on the PN code phase, to locate a particular PN code.

Alternate embodiments of the process of the present invention searches different size windows depending on the time that the radio is turned off. Alternate embodiments also continue to increase the size of the search window to other maximum times, such as 48 hours, before assuming the radio has not left its previous position and reverting back to the initially small search window.

The process of the present invention greatly reduces the time required for a radio to find a signal in a satellite based communication system. By estimating the position of the radio after the radio has been shut down for a period of time, the Doppler shift can be estimated and, therefore, the window of the frequency band and other uncertainties that must be searched is substantially reduced.

I claim:

1. A method for a radio to acquire a communication signal having a predetermined signal carrier frequency, which is received from at least one communications satellite or a constellation of satellites, the radio having a clock and an ephemeris of the at least one satellite, comprising the steps of:

determining a first spatial position for the radio at a first point in time as indicated by the clock;

saving the first spatial position with an associated first time;

determining, at a current time, an amount of time that has passed since the first time;

estimating a second spatial position said radio could move to from said first spatial position during said amount of time that has passed since the first spatial position was determined;

searching a frequency band for the communication signal determined by .the estimated second spatial position, current time, and ephemeris data, within a frequency bandwidth based on said amount of time that has passed.

2. The method of claim 1 and further including each satellite of the constellation of satellites having a clock, each satellite clock being synchronized with the other satellite clocks.

3. The method of claim 2 and further including the step of synchronizing the radio clock to the satellite clocks.

4. The method of claim 1 and further including at least one ground station of the plurality of ground stations having a clock with a time value that is transmitted to the constellation of satellites.

5. The method of claim 1 wherein said bandwidth increases from a predetermined minimum value to a predetermined maximum value as said amount of time that has passed increases.

6. The method of claim 5 wherein said bandwidth decreases to said predetermined minimum value once a preselected amount of time has passed.

7. The method of claim 1 further comprising the step of using a predetermined set of signals from one or more satellites to determine the first spatial position.

8. The method of claim 7 wherein said first spatial position is determined using triangulation based on satellite signal timing.

9. The method of claim 7 wherein said first spatial position is determined using GPS satellite data.

10. The method of claim 1 wherein said frequency band is selected based on estimated Doppler frequency shift for said predetermined signal carrier frequency due to the relationship of the radio estimated second spatial position relative to a spatial position for the satellite at said current time.

11. The method of claim 1 wherein said radio comprises a telephone used in a wireless communication system.

12. The method of claim 11 wherein said communication system comprises a CDMA communication system.

13. A method for a radio to acquire a spread spectrum communication signal having a predetermined PN spreading code applied, which is received from at least one communications satellite of a constellation of satellites, the radio having a clock and an ephemeris of the at least one satellite, comprising the steps of:

determining a first spatial position for the radio at a first point in time as indicated by the clock;

saving the first spatial position with an associated first time;

determining, at a current time, an amount of time that has passed since the first time;

estimating a second spatial position said radio could move to from said first spatial position during said amount of time that has passed since the first spatial position was determined;

searching a PN code phase space for the predetermined PN spreading code, said phase space being determined by the estimated second spatial position, current time, and ephemeris data, within a phase bandwidth based on said amount of time that has passed.

14. The method of claim 13 wherein said bandwidth increases from a predetermined minimum value to a maximum value as said amount of time that has passed increases.

15. The method of claim 14 wherein said bandwidth decreases to said predetermined minimum value once a preselected amount of time has passed.

16. The method of claim 13 wherein said first spatial position is determined using triangulation based on satellite signal timing.

17. The method of claim 13 wherein said first spatial position is determined using GPS satellite data.

18. The method of claim 13 wherein said code phase space to be searched is based on an estimated Doppler phase shift imparted to said predetermined PN spreading code due to the relationship of the radio estimated second spatial position relative to a spatial position for the satellite at said current time.

19. The method of claim 13 wherein said communication system comprises a wireless CDMA communication system.

20. A method for a code division multiple access radiotelephone to rapidly acquire a pilot signal, having a frequency, from a first satellite of a constellation of satellites, the radiotelephone having memory, a clock, and an ephemeris of each satellite of the constellation of satellites stored in the memory, each satellite communicating with a plurality of ground base stations, each ground base station having a clock, a first ground base station transmitting a clock signal from the clock to the first satellite, the method comprising the steps of:

synchronizing the radiotelephone clock to the clock signal;

determining a spatial position for the radiotelephone, the position determined at a first time as indicated by the radiotelephone clock;

storing the spatial position and the first time in memory;

determining a second time from the radiotelephone clock;

estimating a second spatial position in response to a difference between the first time and the second time, the second spatial position being at an increasing distance from the first spatial position as the difference between the first and second times increases up to a predetermined maximum difference; and searching a predetermined frequency band for the frequency in response to the second spatial position.

* * * * *